Jan. 23, 1962 S. I. MacDUFF 3,017,945
POWER STEERING ACTUATOR
Filed June 23, 1958 2 Sheets-Sheet 1
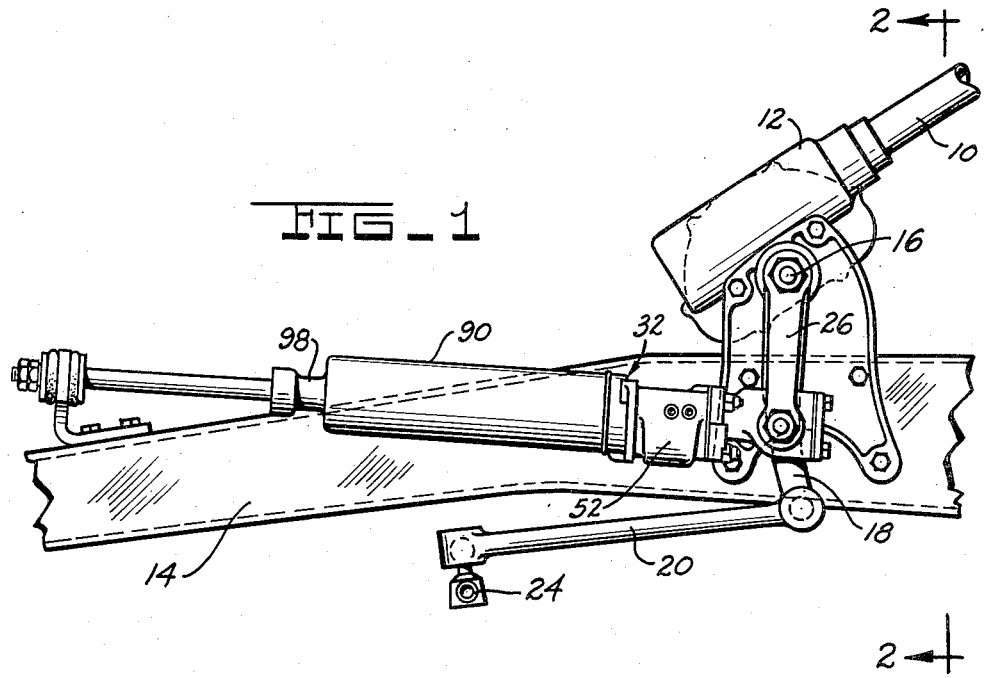
FIG_1
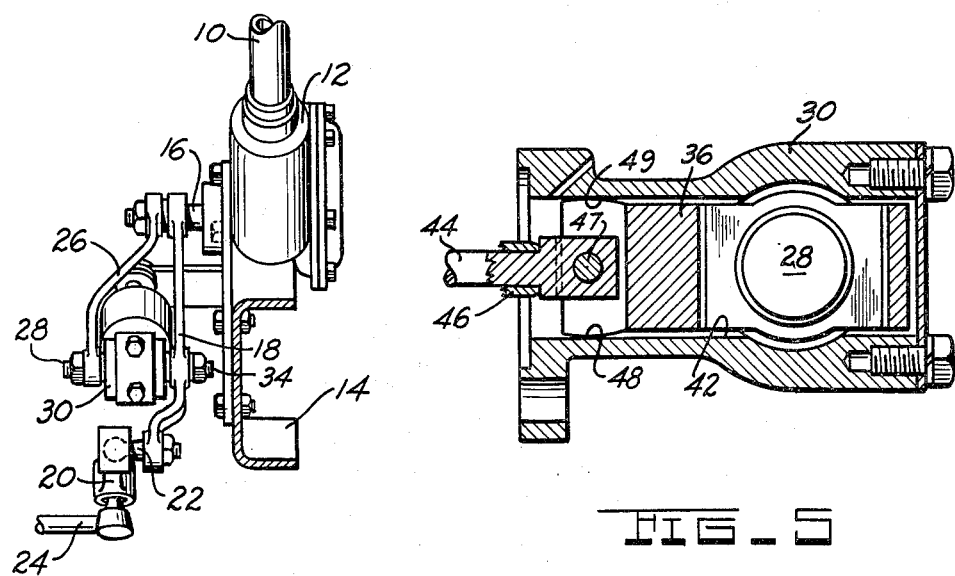
FIG_2
FIG_3
INVENTOR.
STANLEY I. MacDUFF.
BY
William N. Antonio
ATTORNEY.

Jan. 23, 1962 S. I. MacDUFF 3,017,945
POWER STEERING ACTUATOR
Filed June 23, 1958 2 Sheets-Sheet 2
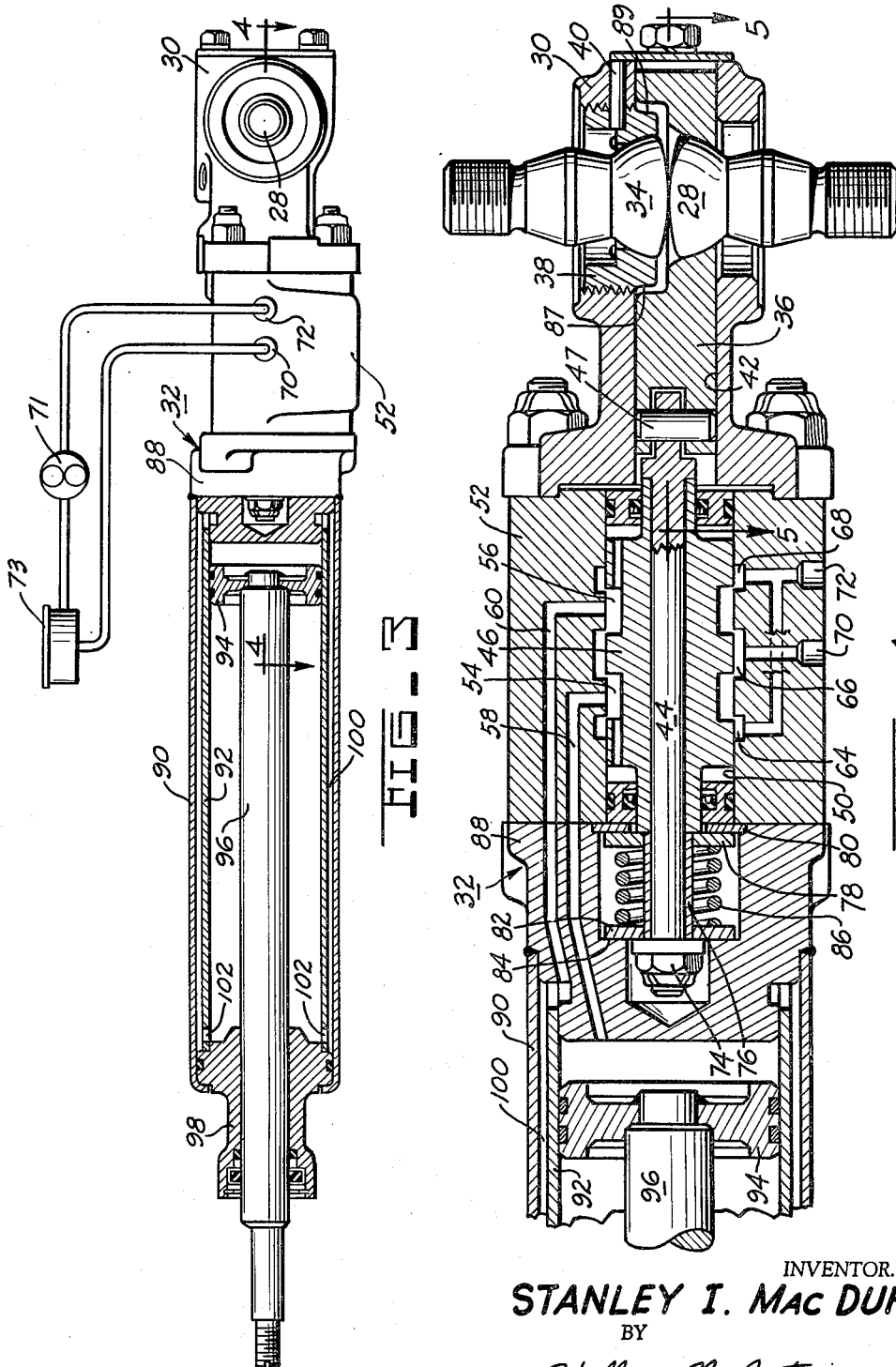
INVENTOR.
STANLEY I. MacDUFF.
BY
William N. Antonio
ATTORNEY 3,017,945
POWER STEERING ACTUATOR
Stanley I. MacDuff, South Bend, Ind., assignor to The Bendix Corporation, a corporation of Delaware
Filed June 23, 1958, Ser. No. 743,901
3 Claims. (Cl. 180—79.2)

This invention relates to power steering and more specifically to improvements in the actuation of a hydraulic power steering unit of the type shown in Frank Patent No. 2,827,974.

Combined valve and power cylinder constructions have often been desired for use in linkage power steering systems, due to the fact that they tend to be more economical and simple to fabricate. However, they have not been used as extensively as they might be, because of certain drawbacks which result from faulty and inadequate actuators.

It is, therefore, an object of this invention to provide an actuating mechanism for a combined unit which will operate in a more effective manner.

Another object of this invention is to provide an actuating mechanism for a combined unit which utilizes the fewest parts to perform the necessary functions with a minimum amount of friction.

A further object of this invention is to provide an actuating mechanism for a combined unit which will permit arcuate movement of the pitman arm without detrimental effects resulting from such movement.

A still further object of this invention is to provide a valve actuating mechanism having a housing and a valve operating member located therein, said valve operating member having means formed thereon for permitting both lateral and sliding motion between the housing and valve operating member.

The above objects, features and advantages of the invention will become apparent from the following description taken in conjunction with the accompanying drawings which form a part of this invention and in which:

FIGURE 1 is a fragmentary side elevation showing the particular power steering unit as preferably installed;

FIGURE 2 is a view taken substantially along line 2—2 of FIGURE 1;

FIGURE 3 shows the combined valve and power cylinder of FIGURE 1 in partial section in conjunction with the hydraulic circuit therefor;

FIGURE 4 is an enlarged sectional view taken along line 4—4 of FIGURE 3; and

FIGURE 5 is a sectional view taken along line 5—5 of FIGURE 4.

Referring to FIGURE 1, numeral 10 indicates a steering shaft connected to a gear box 12, which in turn is suitably connected to the vehicle frame 14. Output or rock shaft 16 extends from the gear box 12 as shown in FIGURE 2. An idler arm 18 is pivotally connected at one end to the rock shaft 16 and at the other end to the drag link 20 via a ball and socket joint 22. The drag link 20 is suitably connected to a tie rod 24.

A pitman arm 26 is fixedly connected at one end to the rock shaft 16 and carries at its other end a half ball stud 28 which is located in actuator housing 30. The actuator housing is suitably connected to the combined valve and cylinder assembly 32 to form an integrated unit. A second half-ball stud 34 is carried by the idler arm 18 intermediate its ends and is located in the actuator housing 30 in juxtaposition to the half-ball stud 28.

A valve actuating member 36 provides a seat for half-ball 28, while a plug-like element 38, which is threaded into housing 30, provides a seat for half-ball 34. The plug-like element is held in position by means of a pin 40. Both of the half balls have arcuate abutting surfaces in order to permit for torsional deflections arising during steering and power boost.

The valve actuating member 36, which is located in a substantially rectangular broached hole 42 of housing 30, is connected to a bolt 44 extending through valve spool 46 by means of a floating pin 47. Referring to FIGURE 5, it will be noted that valve actuating member 36 has two arcuate surfaces 48 and 49 formed on the sides thereof which are centered about floating pin 47, so as to permit pivotal movement of the valve actuating member about pin 47. By providing such arcuate surfaces and a pin connection of the type described, it is possible to eliminate a tendency towards having the valve actuating member bind due to the arcuate movement of pitman arm 26.

The previously mentioned valve spool is the working portion of the valve and is located in a bore 50 of valve housing 52 which is suitably connected to actuator housing 30. The valve spool, which is movable in opposite directions from a normally neutral or center position, controls flow in the hydraulic system. With the valve spool 46 in neutral position, as shown in FIGURE 4, the half ball stud 28 is substantially concentric with half ball stud 34. Formed on valve spool 46 are two annular channels 54 and 56, which communicate with cylinder passages 58 and 60 respectively. The bore 50 of the valve housing is provided with annular channels 64, 66 and 68. Annular channel 66 communicates with return port 70, while annular channels 64 and 68 communicate with inlet port 72. The inlet port is connected to a pump 71 and the return port to a reservoir 73 in the manner shown diagrammatically in FIGURE 3. The control valve shown is an open center type valve which in neutral position allows free flow of the hydraulic fluid between the inlet port 72 and the return port 70 via the annular channels which are arranged in overlapping relationship.

The valve spool 46 is operatively connected to the valve actuating member 36 through bolt 44, pin 47, nut 74 and spacer sleeve 76, said sleeve being located between the valve spool and nut 74. Retaining ring 78, which abuts stop ring 80, and retaining ring 82, which abuts a shoulder 84, confine a preloaded centering spring 86 within a bore of plug 88. With the nut tightened down against spacer sleeve 76, the sleeve 76, valve spool 46, bolt 44 and actuating member 36 form a single functional part. Spool movement is limited by contact of actuating member 36 with plug 38 at either 87 or 89 depending on the direction of movement.

Since a cylindrical member 90, which forms the outer portion of the power cylinder, is welded to plug 88, actuation of the spool valve will cause the power cylinder, control valve and valve actuator housing to move as a unit. Within cylindrical member 90 is an inner sleeve 92 which fits onto a reduced portion of plug 88. Within inner sleeve 92 is a piston 94 which includes suitable rings to provide a sealed fit between the piston and sleeve. A piston rod 96 is welded to the piston and has its opposite end projecting through a rod guide and closure member 98. The rod is suitably anchored to the frame 14. Passage 100 formed by outer and inner cylinders 90 and 92 communicates with cylinder passage 60 and with the piston rod side of the piston through passages 102. Cylinder passage 58 communicates directly with the opposite side of the piston.

Operation of the valve actuator and combined valve and power cylinder unit is as follows:

Rotation of the steering shaft will cause the pitman arm 26 to rotate with rock shaft 16 in a clockwise or counterclockwise direction depending on the direction of rotation of the steering shaft. Movement of the pitman arm in a clockwise direction will cause the valve actuating member 36 and valve spool 46 to move towards the left after the preload of centering spring 86 is overcome. Such movement will result in communication of the large area side of piston 94 with the inlet port 72 via cylinder passage 58, while the rod side of the piston is being communicated with the return port 70 via cylinder passage 60. It should be noted that the detrimental effects resulting from the arcuate motion of the pitman arm 26 are obviated through means of the floating pin connection 47 and the arcuate surfaces 48 and 49 formed on opposite sides of the substantially rectangular valve actuating member 36. The pin connection and arcuate surfaces permit the actuating member 36 to both slide and move laterally with respect to the housing 30 by pivoting about either of the arcuate surfaces. In this manner binding of the actuating member in the housing is completely obviated and frictional forces to be overcome are reduced to a minimum. It should be pointed out that when the pitman and idler arms reach their extreme positions, the movement of the pitman arm ball stud 28 is as much lateral as it is axial.

Movement of the pitman arm in a counterclockwise direction will cause the valve actuating member 36 and valve spool 46 to move towards the right after the preload of centering spring 86 is overcome. Such movement will cause pressurization of the rod side of the piston. Spool movement is limited in both directions by engagement of the valve actuating member 36 with the fixed plug like element 38. Power is transmitted to the drag link 20 through the idler arm 18 via the half ball stud 34.

Having thus described and illustrated my invention, what I claim as new and desire to secure by Letters Patent is:

1. In a power steering system having a power cylinder, a spool type valve for controlling the operation of said power cylinder, and a valve actuator for actuating said valve, means for interconnecting said valve and valve actuator comprising a housing having a substantially rectangular passage formed therein, a substantially rectangular shaped member operatively connected to said actuator and slidable in said passage, and means for pivotally connecting said member to the spool of said control valve, said connecting means including a floating pin, and two arcuate surfaces centered about said floating pin and disposed on opposite sides of said member for contact with the walls of said passage.

2. In a power steering system having a power cylinder, a valve for controlling the operation of said power cylinder, and a valve actuator for actuating said valve, means for interconnecting said valve and valve actuator comprising a housing having a substantially rectangular passage formed therein, a substantially rectangular member pivotally connected to said valve and operatively connected to said valve actuator, and arcuate means formed on the surface of said member on opposite sides thereof for permitting sliding and lateral movement of said member within said passage, said arcuate means being in contact with the opposite walls of said passage.

3. In a power steering system having a power motor, a valve for controlling the operation of said power motor, and a valve actuator for actuating said valve, means for interconnecting said valve and valve actuator comprising a housing having a substantially rectangular passage formed therein, a substantially rectangular member pivotally connected to said valve and operatively connected to said valve actuator, and means formed on said member on opposite sides thereof and said pivotal connection for permitting sliding and lateral movement of said member within said passage, said last named means being in contact with the walls of said passage.

References Cited in the file of this patent

UNITED STATES PATENTS

| | | |
|---|---|---|
| 2,682,778 | Creson | July 6, 1954 |
| 2,755,627 | Smith et al. | July 24, 1956 |
| 2,765,042 | Day | Oct. 2, 1956 |
| 2,827,123 | Lincoln et al. | Mar. 18, 1958 |
| 2,827,974 | Frank | Mar. 25, 1958 |